Jan. 4, 1955     D. R. HEPWORTH     2,698,646
FOLDING HOT SEAT
Filed Feb. 23, 1952     2 Sheets-Sheet 1
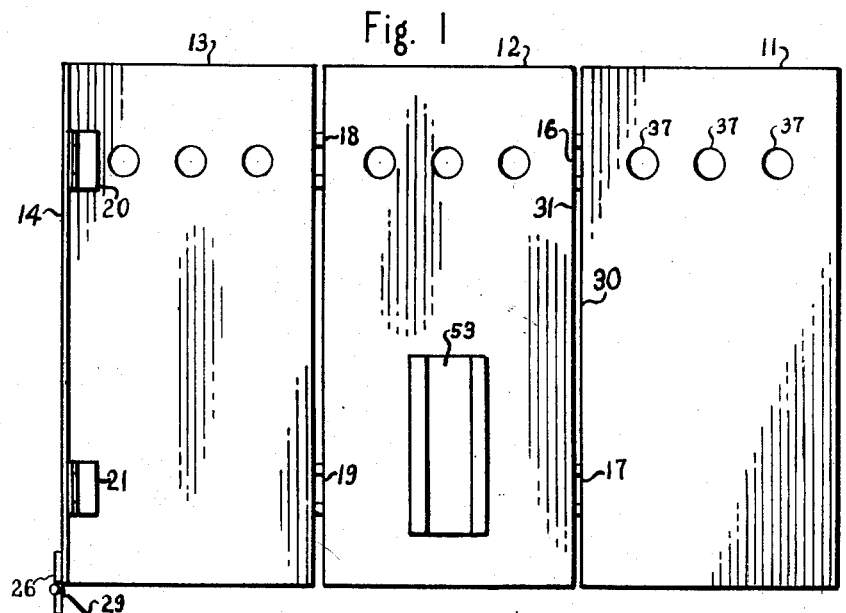
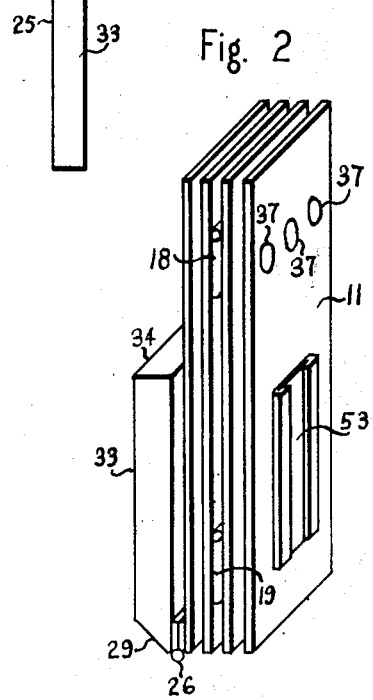
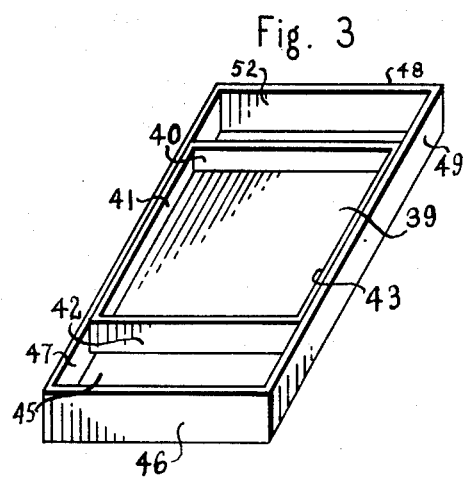
INVENTOR
DANIEL R. HEPWORTH
By *Orel J. Burdick*
Attorney.

Jan. 4, 1955 D. R. HEPWORTH 2,698,646
FOLDING HOT SEAT
Filed Feb. 23, 1952 2 Sheets-Sheet 2
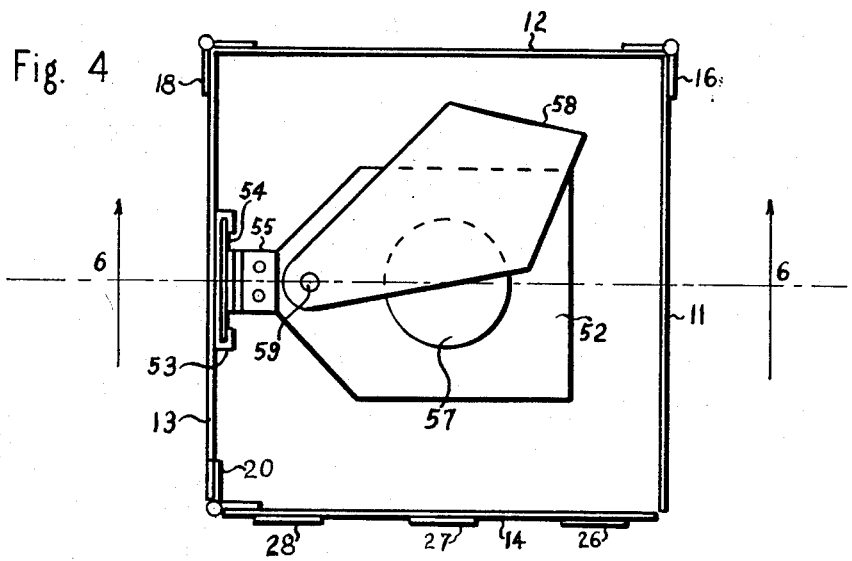
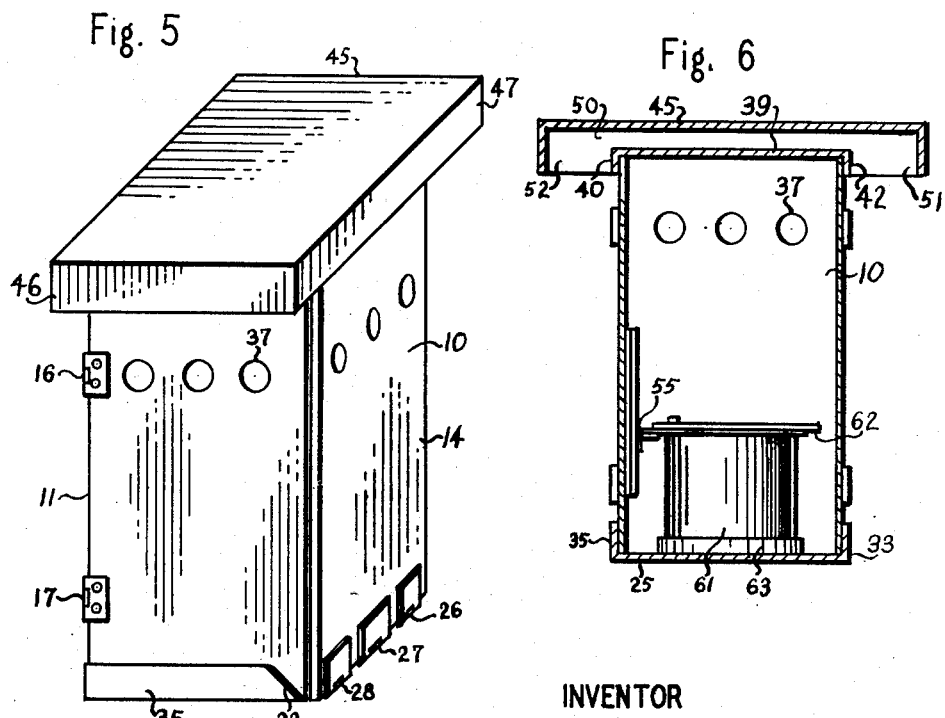
INVENTOR
DANIEL R. HEPWORTH
By *Orel J. Burdick*
Attorney.

United States Patent Office 2,698,646
Patented Jan. 4, 1955

2,698,646

FOLDING HOT SEAT

Daniel R. Hepworth, Muskegon, Mich.

Application February 23, 1952, Serial No. 272,968

6 Claims. (Cl. 155—1)

This invention relates to a heating device for use by sportsmen to keep themselves warm while fishing through the ice or waiting on a deer trail or other activities involving waiting out of doors or in unheated shelters such as are used for fishing through the ice. My device takes the form of a heated seat which is easily collapsible and can be set up by the sportsmen under conditions encountered in hunting and fishing during winter weather.

Such a seat should be collapsible and in its collapsed or folded form should go into very small space. In its preferred form my seat will fit into the game pocket of an ordinary hunting coat, making it extremely convenient, especially to deer hunters and fishermen since these persons do not have any other use for the game pocket. The burner or heat producing means in such a seat must be light, small, portable, and entirely self-contained.

It is, then, an object of this invention to provide a heated seat for hunters and fishermen and the like that will lighten portability and collapsibility to fulfill these requirements.

It is another object of this invention to provide such a seat containing a small, safe, and portable heating element.

It is an additional object of this invention to provide such a seat that will collapse to a size that can be carried in the game pocket of a conventional hunting coat.

Other and further objects of this invention will be evident from this specification and claims and from the accompanying drawings.

Figure 1 is a side elevational view of my seat in an unfolded position without the cover and without the heating mechanism.

Figure 2 is a perspective view of my seat in a collapsed position, without the heating device or cover.

Figure 3 is a perspective view of the under side of the cover of my seat.

Figure 4 is a top view of my seat assembled for use with the cover removed.

Figure 5 is a perspective view of my seat assembled for use.

Figure 6 is a sectional view of my assembled seat taken along line 6—6 of Figure 4, with parts shown in elevation.

In its assembled form, my seat comprises a rectangular portion shown generally at 10 which is formed from the four sides 11, 12, 13, and 14 which are hinged together by means of hinges as shown at 16, 17, 18, 19, 20, and 21. A bottom plate 25 is hinged onto the lower end of side 14 by means of the hinges 26, 27, and 28. The manner of hinging is important as only a limited number of arrangements of which the form illustrated is one, will permit the folding of the rectangular portion 10 into a compact bundle.

The edge 30 of the side 11 is attached to the edge 31 of the side 12 by means of the hinges 16 and 17 which are placed on the outside of the rectangular portion 10. The side 12 is attached to side 13 by the hinges 18 and 19 which are similarly placed on the outside of the rectangular tube 10. Sides 13 and 14 are attached together by the hinges 20 and 21 which are placed on the inside of the box portion 10.

The bottom plate 25 is hinged to the bottom end of the side 14 by hinges as shown at 26, 27, and 28. The bottom plate 25 has its edges turned up as shown at 33, 34, and 35 to form a rim encompassing three sides of the bottom 25. The dimensions of this rim formed of the edges 33, 34, and 35 should be such as to make a tight fit over the bottom of the tube 10 when the device is assembled as shown in Figure 5. Toward the top of the top of the tube 10, a plurality of holes 37 occur in one or more of the sides 11, 12, 13, and 14 to permit the escape of heated air and gases.

The cover to my seat, shown generally in Figure 3, comprises two metal sheets with turned up edges placed one inside the other. The smaller of these, shown at 39 has all of its edges turned up as at 40, 41, 42, and 43. The interior dimension of these turned up edges should be such that they will not only fit over the top of the tube 10, but will also fit snugly over the outside of the bottom edges 33, 34, and 35.

The second portion of my cover is a somewhat larger box shown generally at 45. It has turned up edges as shown at 46, 47, 48, and 49. The inside piece 39 and the outside piece 45 are assembled by either spot welding or other suitable means of permanently joining the edges 41 to 47 and the edges 43 to 49. The width of the turned up edges on 39 and 45 should be such that when thus assembled an air space will be left between the flat surfaces of 39 and 45 as shown at 50. The air space 50 communicates with the outside air through two openings 51 and 52, located at the two ends of the outside cover 45.

The interior of my seat contains a burner or heating device 61. This burner may most conveniently be a can containing a colloidal jelly, the principal fuel component of which is alcohol and which is commonly called canned heat. The fuel and the can 61 containing it do not form a part of the present invention, and since such canned fuel is currently being produced by several manufacturers, it will not be described in detail. However, formulas illustrative of suitable fuels which may be used in this manner will be found in U. S. Patents Numbers 1,262,267; 1,262,268; 1,299,408 and 1,313,876.

As the cans in which canned heat is sold have too large an opening and would burn too rapidly and produce too much heat for use in my device, it is necessary to provide a cover to diminish the size of the opening as is shown at 62. Since canned heat is marketed in containers of various sizes by various manufacturers, it is necessary to introduce an element of adjustability into the construction of the cover 62. This is done by means of a slide 53, which is attached to one of the sides of my tube 10. This slide may be attached to a side which folds into the interior of my device, as shown in Figure 1 where the said slide 53 is attached to the side 12 or it may be on a side which is on the exterior of my device when folded as in Figure 2 where it is attached to the side 11. A slider 54 slides up and down in the slide 53. This slider 54 may fit the slide 53 loosely, so that the cover 62 may lie flat across the top of the can 61. Also, the turned up edges 33 and 35 of the bottom plate 25 may be cut away as at 29 and 32 which makes for greater ease in setting up my seat. The cover 62 is attached to the slider 54 by a hinge 55, so that the said cover will fold upwardly against the side 11 or 12 to which the slide 53 is attached.

The purpose of the cover 62 is to restrict the opening in the top of the can 61 so that only a small orifice will be exposed. By this means the size of the flame from the burning alcohol in can 61 can be reduced to any desired size. This result may be accomplished by making the cover 62 solid and so placing the can 61 that only a small segment of its upper surface is uncovered. However, I prefer to provide a hole 57 in the cover 62 and cover it with a plate 58 which is attached to the cover 62 by means of a rivet or other fastening device 59. In this way, the amount of exposure of the top of the can 61 can be adjusted by moving the position of the plate 58. When an adjustment such as the plate 58 is used, a circular rim 63 may be provided on the bottom plate 25 to prevent the can 61 from moving about as a result of jarring or tilting of my seat.

A convenient size for my seat is to have the sides 11, 12, 13, and 14 measure about 6 inches in width, 12 inches in height. The total height of the assembled piece will then be greater than one foot. However, it will be understood that I do not restrict myself to any particular size, the above mentioned sizes merely being those most convenient for making a useable seat which, when folded, will slip into the pocket of the conventional hunting coats that are now on the market. Also, the position of my slide 53, whether on side 11, as illustrated in Figure 2, side 12 as illustrated in Figure 1, or on one of the remaining sides is a matter of design and may be varied as desired.

The material of which my seat is made is preferably a metal such as iron or aluminum, hot or cold rolled iron in 22 gauge being satisfactory. Non-metallic materials such as pressed wood and various composition sheets may also be used but are not preferred because of their greater bulk.

The hinges 16, 17, 18, 19, and 20, and 21, and also hinges 26, 27, 28, need not be separate hinges as illustrated but may, if desired, be formed as integral parts of the sides 11, 12, 13, and 14, and the bottom 25. Also, the turned up edges 33 and 35 of the bottom plate 25 may be cut away as at 29 and 32 which makes for greater ease in setting up my seat. The purpose in having the cover shown in Figure 3 fit over the bottom 25 is so that these parts may nest together when my seat is in a folded position, thereby forming a compact package. Due to the small size of flame needed, it is not ordinarily necessary to have any ventilation or lower draft opening beside what is supplied by the looseness of the sides of my seat. For the top vents, the series of openings 37, the preferred diameter of which is ¾ths inch is needed.

A suitable source of heat has been illustrated and described. The most important property of any source of heat used in my device is that it shall be capable of giving off heat in small quantity, as my seat is easy to overheat. Only small quantities of heat are needed to make my device effective for the purpose for which it is designed. For example, when canned heat is used in my device, the cans last many times longer than when burned in stoves designed for their use. Other requirements for a preferred heat source for my device is that it shall be rugged, safe, easy to light and operate out of doors. In use my seat assembled as shown in Figure 5 is placed on the ground or in an ice fishing shelter, and the burner is lighted. When seated on my device, the coat of the sitter will ordinarily hang down around my device so that the heat leaving the holes 39 will rise inside the coat keeping the sitter comfortably warm.

I am aware that numerous changes may be made and many details of construction may be varied through a wide range without departing from the principles of my invention, and I, therefore, do not purpose limiting the patent granted hereon otherwise than necessitated by the scope of the appended claims.

I claim as my invention:

1. A seat comprising four foldable sides, hinges connecting said sides, a bottom hinged onto one of said sides a top separate from the sides and bottom of said seat, the said top being large enough to slip over the said bottom, a vertical slideway along the inside surface of one of said sides, a slider in said slideway and a cover attached to said slider.

2. A seat comprising four foldable sides, hinges connecting said sides, a bottom hinged onto one of said sides, a top separate from the sides and bottom of said seat, the said top being large enough to slip over the said bottom and comprising an inner portion having an interior size larger than the exterior of said bottom portion, and an outer portion spaced from said inner portion and making a snug fit with said inner portion on two sides, and a vertical slideway along the inside surface of one of said slides, a slider in said slideway, a cover hingably attached to said slider, a hole in said cover and a plate slidably attached to said cover for adjusting the exposed portion of said hole.

3. A heated seat comprising four sides forming a rectangular tube, said sides being hinged together along three of the four edges of said tube, a bottom plate, a hinge connecting said bottom plate to one end of one of said sides, turned up edges on three sides of said bottom plate, and spaced to fit over an end of said tube, corners cut away on two of said turned up edges nearest said hinge, a cover comprising an inside and an outside plate in spaced relationship to each other, the edges of said inside plate being turned down to form a rectangular rim sized to fit over said bottom, and the edges of said outside plate being turned down to form a rectangular rim sized to fit over said edges of said inside plate on two sides and of substantially greater size than said inside plate on the remaining two sides, a slideway on the inside surface of one of said sides, a slider movable in said slideway, a plate hingedly attached to said slider, a hole in said plate, a cover pivotally attached to said plate for adjusting the exposed area of said hole, holes in said sides opposite said bottom, and retaining means on said bottom for holding a heat producing device.

4. A seat comprising four sides pivotally connected together, a bottom pivotally connected to a lower end of one of said sides, and a top comprising two plates, means to hold said plates in spaced relationship, a rim projecting from one of said plates, the dimensions of said rim being slightly larger than the exterior dimensions of said bottom, and also larger than the exterior dimensions of the upper end of said seat, and a cover for a heat producing device hinged along a horizontal axis on an inside surface of one of said sides near a lower edge of said side.

5. A seat comprising four sides pivotally connected together, a bottom pivotally connected to a lower end of one of said sides, and a top comprising two plates, means to hold said plates in spaced relationship, a rim projecting from one of said plates, the dimensions of said rim being slightly larger than the exterior dimensions of said bottom, and also larger than the exterior dimensions of the upper end of said seat, a cover for a heat producing device hinged along a horizontal axis on an inside surface of one of said sides near a lower edge of said side, a hole in said cover and a closure for said hole attached to said cover.

6. A seat comprising four sides pivotally connected together, a bottom pivotally connected to a lower end of one of said sides, and a top comprising two plates, means to hold said plates in spaced relationship, a rim projecting from one of said plates, the dimensions of said rim being slightly larger than the exterior dimensions of said bottom, and also larger than the exterior dimensions of the upper end of said seat, a cover for a heat producing device hinged along a horizontal axis on an inside surface of one of said sides near a lower edge of said side, a hole in said cover and a closure for said hole attached to said cover, and a can adapted to hold fuel, resting on the said bottom and under said cover.

References Cited in the file of this patent

UNITED STATES PATENTS

| | | |
|---|---|---|
| 92,779 | Benns | July 20, 1869 |
| 206,422 | Collier | July 30, 1878 |
| 278,466 | Stockdale | May 29, 1883 |
| 963,769 | Johnson | July 12, 1910 |
| 1,094,151 | Kemp | Apr. 21, 1914 |
| 1,192,411 | Fulton | July 25, 1916 |
| 1,194,570 | Stuart | Aug. 15, 1916 |
| 1,238,080 | Ball | Aug. 28, 1917 |
| 1,372,302 | Lang | Mar. 22, 1921 |
| 1,745,828 | Barnes | Feb. 4, 1930 |
| 2,244,935 | Binger | June 10, 1941 |
| 2,483,787 | Sheraski | Oct. 4, 1949 |
| 2,517,254 | Steele | Aug. 1, 1950 |
| 2,532,863 | Taylor | Dec. 5, 1950 |
| 2,581,131 | Naranick | Jan. 1, 1952 |
| 2,583,816 | Butler | Jan. 29, 1952 |

FOREIGN PATENTS

| | | |
|---|---|---|
| 482,595 | France | Jan. 9, 1917 |
| 668,398 | Germany | Dec. 2, 1938 |